United States Patent [19]

Miura et al.

[11] Patent Number: 4,727,413
[45] Date of Patent: Feb. 23, 1988

[54] IMAGE SENSING APPARATUS

[75] Inventors: Akimitsu Miura, Tokyo; Tadashi Okino; Shinji Sakai, both of Kanagawa, all of Japan

[73] Assignees: Canon Kabushiki Kaisha; Canon Seiko Kabushiki Kaisha, both of Tokyo, Japan

[21] Appl. No.: 758,151

[22] Filed: Jul. 23, 1985

[30] Foreign Application Priority Data

Jul. 24, 1984 [JP] Japan .................... 59-154777

[51] Int. Cl.⁴ .................................. H04N 9/74
[52] U.S. Cl. ............................. 358/29; 358/161
[58] Field of Search ........... 358/170, 228, 161–163, 358/209, 29 C

[56] References Cited

U.S. PATENT DOCUMENTS 3,445,590  5/1969  Dischert et al. ............ 358/228
4,219,841  8/1980  Nishimura et al. ......... 358/29 C
4,365,272 12/1982  Nagai .......................... 358/228
4,556,912 12/1985  Yamanaka et al. .......... 358/228

Primary Examiner—Jin F. Ng
Assistant Examiner—Stephen Brinich
Attorney, Agent, or Firm—Toren, McGeady & Associates

[57] ABSTRACT

The disclosed image sensor device for obtaining a still picture, achieves a high degree of color reproducibility by adjusting white balance using the output of an image sensor. The white balance is adequately controlled with the levels of signals from the image sensor made apposite by controlling the light quantity incident on the image sensor during the white balance adjustment.

12 Claims, 5 Drawing Figures

IMAGE SENSING APPARATUS

BACKGROUND OF THE INVENTION

1. Field of the Invention

This invention relates to an image sensing apparatus which permits white balance setting with ease.

2. Description of the Prior Art

Heretofore, operators of image sensing devices, such as video cameras, have obtained a white balance, after turning on a power supply switch, by pushing a white balance switch while directing the camera lens toward a white wall or the like.

Meanwhile, various image sensing devices of the kind adapted to take still pictures have been developed over recent years. It is important for devices of this kind to achieve a stand-by state as promptly as possible after the power supply is switched on in order to take advantage of opportunities to take pictures. However, conventional video cameras have been too poorly designed to meet this requirement.

There is another disadvantage to the conventional video camera. When the power supply is on, an automatic light quantity control (ACL) circuit performs a servo control operation on the aperture of an iris to control the light quantity incident on the image sensor. However, in sensing light from an object having a broad dynamic range, the output of the image sensor, for example, becomes saturated and a correct white balance adjustment is not possible.

Moreover, it would be advantageous to have an image sensor which could be used with presently available lenses for existing cameras using silver halide film.

SUMMARY OF THE INVENTION

It is an object of this invention to provide an image sensing apparatus which is capable of eliminating the above-stated shortcomings of the prior art.

It is another object of this invention to provide an image sensing apparatus which permits easy and correct white balance setting not only for a lens having an automatic aperture control device but also for a lens of the manual aperture control type.

To attain these objects, an embodiment of the invention is provided with an exposure control arrangement which begins to control light quantity incident on image sensing means along with the operation of white balance setting means. This arrangement enhances the operability of the apparatus to a great degree for white balance setting.

In another embodiment of this invention, when a manual aperture control type lens is mounted on the apparatus, the light quantity incident on the image sensing means is controlled by means of a shutter along with the operation of white balance setting means, so that the white balance can be controlled to obtain an apposite signal level even with a lens having no automatic aperture control device.

In a further embodiment of this invention, white balance controlling light quantity is adjusted under a programmed control using an iris and a shutter in a lens incorporating therein an automatic aperture control device, so that white balance control can be adequately accomplished even for a light of a wide dynamic range.

These and further features of this invention will become apparent from the following detailed description thereof taken in connection with the accompanying drawings.

DETAILED DESCRIPTION OF THE PREFERRED EMBODIMENTS

Figure 1A:
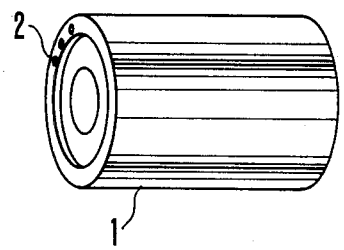
FIGS. 1A, 1B and 1C are oblique views of the appearance of an image sensing apparatus embodying this invention, FIG. 1A showing a lens barrel,
FIG. 1B the front side of the embodiment and
FIG. 1C the rear side thereof.
Figure 1B:
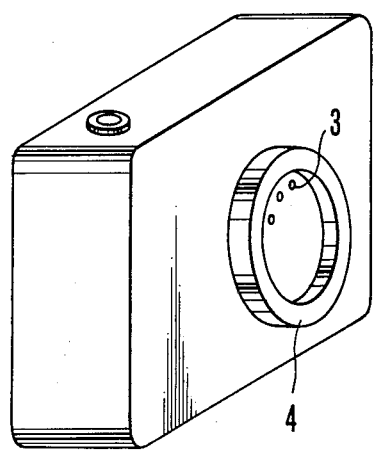
Figure 1C:
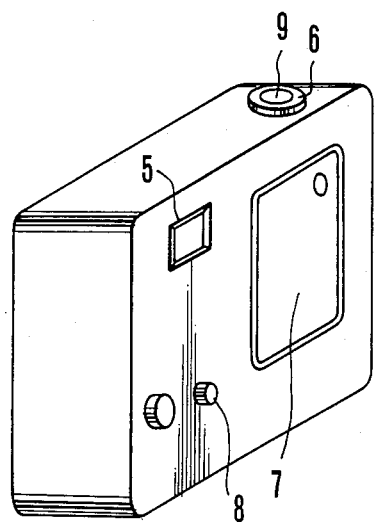

The following describes an embodiment of this invention:

The appearance of the image sensing apparatus is as shown in FIGS. 1A, 1B and 1C. The illustration includes a lens barrel 1, and signal contacts 2 and 3 which are respectively disposed both on an end of the lens barrel 1 and on the side of a camera body. An aperture control signal produced within the lens barrel 1 and a signal for determining whether the lens mounted is a lens designed solely for the apparatus, are exchanged between the camera body and the lens barrel 1 through these signal contacts 2 and 3. The camera body is provided with a mount 4 for mounting the lens barrell; an optical view finder 5; a shutter dial 6; a shutter release button 9, which is arranged to turn a power supply switch 9a on by a first step of an operation stroke thereof and to turn a release switch 9b on by a second step; a jacket insertion opening 7; and an automatic white balance setting switch 8.

Figure 2:
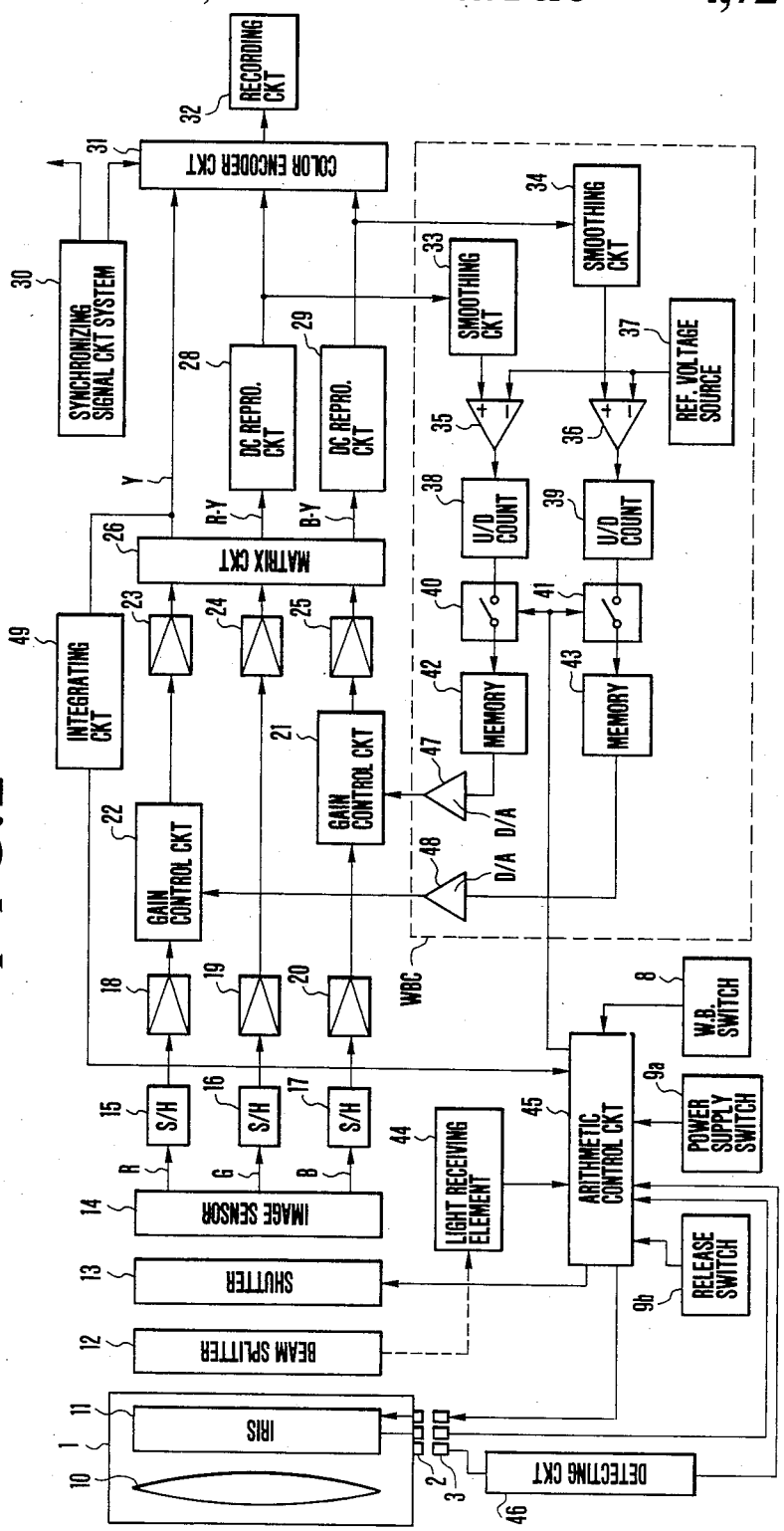
FIG. 2 is a circuit diagram showing, by way of example, the arrangement of the image sensing apparatus shown in FIGS. 1A to 1C.

FIG. 2 shows, by way of example, the arrangement of the image sensing apparatus according to this invention. In FIG. 2, the same elements as those shown in FIGS. 1A to 1C are indicated by the same reference numerals. The arrangement includes a photo-taking lens 10; an iris 11, which is employed as exposure control means; a beam splitter 12, which is arranged to guide a portion of a light flux coming via the iris 11 to a light receiving or photosensitive element 44; a shutter 13, which is arranged to serve as exposure control means; an image sensor 14, which is arranged to convert an optical image into an electrical signal as image sensing means; sample-and-hold circuits 15, 16 and 17; amplifiers 18, 19 and 20; gain control circuits 21 and 22; process amplifiers 23, 24 and 25; a matrix circuit 26; DC reproduction circuits 28 and 29; a color encoder circuit 31; a synchronizing signal circuit system 30; a recording circuit 32; smoothing circuits 33 and 34; comparators 35 and 36; a reference voltage source 37; up-down counters 38 and 39; switches 40 and 41; memories 42 and 43; digital-to-analog (D/A) converters 47 and 48; an arithmetic control circuit 45; a detecting circuit 46, which is arranged to detect a lens barrel incorporating a manual aperture control device therein when a lens barrel of this type is mounted on the apparatus; and an integrating circuit 49. A block WBC represents a white balance circuit which is arranged to serve as white balance setting means.

Figure 3:
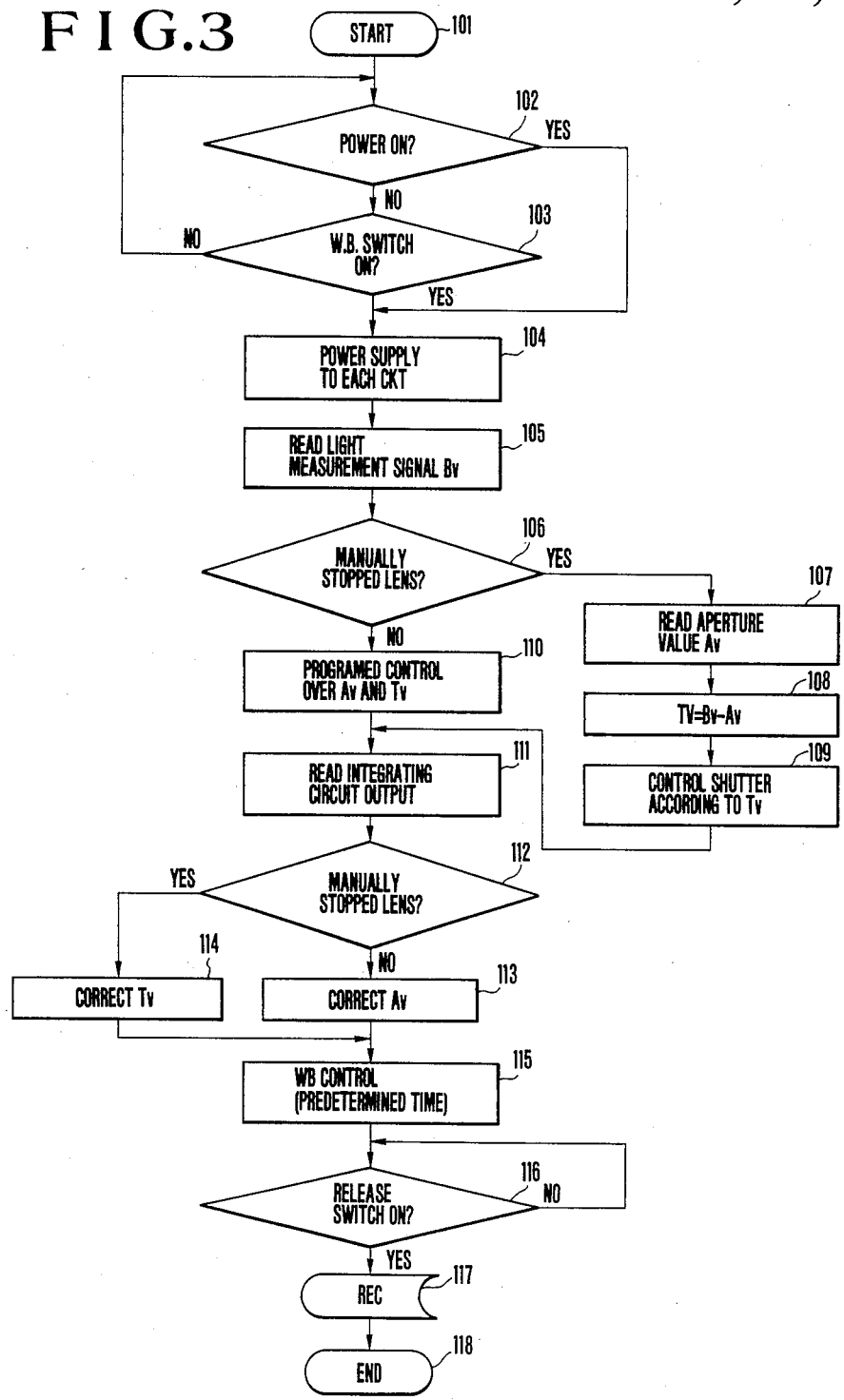
FIG. 3 is a flow chart showing, by way of example, the operation of the image sensing apparatus.

FIG. 3 is a flow chart showing the operation of the essential parts of the embodiment shown in FIG. 2. Referring to FIG. 3, the operation begins with a step 101. At a step 102, it is determined whether or not the power supply switch 9a is on. If not, it is determined whether or not the white balance switch 8 is on at a step 103. If not, the operation comes back to the step 102. When the respective switch 9a or 8 is determined to be on at the step 102 or 103, the operation proceeds to a step 104. At the step 104, power supply is effected to each applicable circuit. In this specific embodiment of the invention, the white balance switch 8 is arranged to serve also as a power supply switch. By virtue of this arrangement, white balance control can be accomplished by a fewer number of steps of operation. In other words, the white balance control can be performed by just pushing the white balance switch 8 with the image sensing apparatus directed to a white sheet of paper or the like. Further, since the white balance switch 8 is arranged separately from the power supply switch 9a, the white balance does not have to be readjusted every time the power supply is switched on.

At a step 105, a light measurement signal Bv is read from the light receiving element 44 into the arithmetic control circuit 45. The light measurement signal Bv represents a luminance value Bv obtained through an APEX computation operation.

Next, at a step 106, the detecting circuit 46 detects whether the apparatus is loaded with a lens barrel of the kind incorporating a manual aperture control device. In the event of the lens barrel incorporating the manual aperture control device, an aperture value Av is read into the arithmetic control circuit 45 at a step 107. In this case, the value Av corresponds to an aperture value obtained through an APEX computation operation. At a next step 108, a value Tv is obtained by carrying out a computation according to a formula $Tv=Bv-Av$. The value Tv corresponds to an exposure time value obtained through APEX computation.

At a step 109, the operation of the shutter 113 is controlled on the basis of a shutter time value corresponding to the value Tv.

When the lens barrel detected at the step 106 is not a manual aperture controlling lens barrel but is a lens barrel incorporating an automatic aperture control device which is used solely for the lens barrel, the iris 11 and the shutter 13 are respectively controlled at a step 110 to obtain values Av and Tv predetermined according to the above-stated value Bv.

The embodiment of the invention is arranged such that, when using a lens barrel incorporating an automatic aperture control device, not only the aperture but also the shutter is controlled according to the brightness of the object to be photographed. The embodiment is, therefore, capable of adequately coping with a light quantity of an extremely wide dynamic range.

The operation of the embodiment then proceeds to a step 111. At the step 111, the output of the integrating circuit 49 is read into the arithmetic control circuit 45. The integrating circuit 49 is arranged to integrate a luminance signal obtained either at the step 109 or the step 110 from the image sensor 14 which is under the exposure control. Therefore, compared with a light measurement data obtained from the light receiving element 44, the integrating circuit 49 gives a far more accurate luminance value B'v. Following that, at a step 112, it is again determined whether or not the lens barrel is of the kind incorporating a manual aperture control device. If the lens barrel incorporates a manual aperture control device, computation is performed according to a formula $B'v-Av=T'v$. Then, the controlling value Tv of the shutter 13 is changed to the value T'v at a step 114. Since the control to be performed at the step 114 involves only the operation of $Tv-Tv=\Delta Tv$, the control is completed in a short period of time and yet the exposure control is accomplished with a high degree of accuracy.

In the event of detection of a lens barrel incorporating an automatic aperture control device at the step 112, the value Tv obtained at the step 110 and a newly obtained value B'v are subjected to computation at a step 113 to obtain:

$$B'v-Tv=A'v$$

Further, the aperture is adjusted to an extent as much as $A'v-Av=\Delta Av$.

Upon completion of the step 113 or 114, the operation proceeds to a step 115. The switches 40 and 41 of FIG. 2 are turned on for a predetermined period of time at the step 115. With these switches turned on, the white balance is controlled as will now be described: After attainment of a desired AE (exposure control) value with the aperture of the iris 11 and the shutter 13 having been controlled, R, G and B signals produced from the image sensor 14 are supplied to the process amplifiers 23, 24 and 25, respectively, via the sample-and-hold circuits 15, 16 and 17 and the preamplifiers 18, 19 and 20. Then, at the matrix circuit 26, a luminance signal (hereinafter called the signal Y) and color difference signals R−Y and B−Y are respectively formed. The color difference signals B−Y and B−Y are then respectively supplied to the DC reproduction circuits 28 and 29, each of which includes a low-pass filter and a clamping circuit.

The outputs of the DC reproduction circuits 28 and 29 are supplied, together with the signal Y, to the known color encoder circuit 31. The circuit 31 converts them into, for example, an NTSC signal, which is guided to the recording circuit 32. The color-difference signal outputs of the DC reproduction circuits 28 and 29 are also applied via the smoothing circuits 33 and 34 to the comparators 35 and 36 to be compared with the output of the reference voltage source 37. The values of the up-down counters 38 and 39 are adjusted according to difference signals produced from these comparators 35 and 36. The outputs of the up-down counters 38 and 39 are supplied to and stored at the memories 42 and 43 when the switches 40 and 41 are on. The D/A converters 47 and 48 control the gains of the gain control circuits 21 and 22 on the basis of the values stored at the memories 42 and 43 in such a manner that the gain ratio of each color signal is controlled to make the color difference signals R−Y and B−Y zero, respectively.

With the switches 40 and 41 turned on for a predetermined period of time at the step 115 as mentioned above, the memories 42 and 43 store new values in place of previously stored values. Then, when these switches 40 and 41 are turned off, the white balance control is performed on the basis of the values stored by the memories 42 and 43 until the switches 40 and 41 are again turned on.

Upon completion of the white balance control, it is determined whether the shutter release switch 9b is on or not at a step 116. If it is determined to be on, the operation proceeds to a next step 117. At the step 117, a recording subroutine is performed. More specifically, a gate within the color encoder 31 opens for a predetermined period of time to allow the video signal to be supplied to the recording circuit 32.

Since the recording circuit 32 has been receiving power supply after the time of the step 104, a recording operation is performed immediately after the opening of the above stated gate.

With the sequence of operation processes all having been completed in this manner, the operation proceeds to a step 118 and a program comes to an end.

In the embodiment described, the determination or discrimination between an automatic aperture controlling lens barrel and a manual aperture controlling lens barrel is arranged to be accomplished by means of the signal contacts 2 and 3. However, this discriminating arrangement may be replaced with some other suitable arrangement. For example, such a difference may be optically detected with a notch or the like provided in some suitable part of the lens barrel.

Further, in the embodiment described, the white balance control is arranged to be performed by adjusting the levels of chrominance signals within the image sensing apparatus when a white image is sensed. However, this invention is not limited to this arrangement. The white balance may be accomplished, in accordance with this invention, by means of a sensor separately arranged, for example, to detect the color temperature of the object to be photographed.

What is claimed is:

1. A white balance control system comprising:
    image sensing means for producing a video signal including different color components;
    white balance setting means for controlling white balance of the video signal of said image sensing means; and
    exposure control means for exposing the image sensing means during a first mode for controlling the white balance setting means and exposing the image sensing means during a second mode for outputting a white balanced video signal from said image sensing means.

2. An apparatus according to claim 1, wherein said exposure control means comprises program exposure control means including diaphragm and shutter means.

3. An apparatus according to claim 1, wherein said exposure control means includes a shutter.

4. An imaging sensing apparatus comprising:
    image sensing means;
    white balance setting means for setting a white balance of an output of said image sensing means; and
    exposure control means for controlling a light quantity incident on said image sensing means in response to operation of said white balance setting means for outputting a white balanced output from said image sensing means, said exposure control means including an interchangeable optical system.

5. An apparatus according to claim 4, wherein said exposure control means includes discriminating means to discriminate one characteristic of said optical system from another.

6. An apparatus according to claim 5, wherein said exposure control means is arranged to switch a mode of the exposure control from one mode to another according to the discrimination of said discriminating means.

7. An image sensing apparatus comprising:
    (a) image sensing means for sensing an image;
    (b) recording means for recording a still picture image by obtaining the image sensed by said image sensing means;
    (c) white balance control means for controlling balance of chrominance signals by using signals obtained from said image sensing means;
    (d) operating means for operating said white balance control means; and
    (e) light quantity control means for controlling light quantity incident upon said image sensing means in response to said operating means.

8. A white balance control system for an image sensing device, comprising:
    sensing means for producing a first color component signal and a second color component signal;
    white balance control means for controlling white balance of the image sensing device with a control signal based on the first color component signal and the second color component signal; and
    control means for controlling a light quantity incident on said sensing means in response to said white balance control means which produces the white balance control signal based on the first color component signal and the second color component signal, and for thereafter outputting a white balanced video signal using said white balance control signal.

9. A white balance control system according to claim 8, wherein said white balance control means comprises memory means for storing the white balance control signal based on the first color component signal and the second color component signal.

10. A white balance control system according to claim 8, wherein said exposure control means is operatively connected to the sensing means so as to be controlled by an output of the sensing means.

11. A white balance control system for an image sensing device which produces a video signal having different color components to be white balance controlled, comprising:
    (a) sensing means for producing a control signal for the white balance control of the image sensing device;
    (b) white balance control means for controlling the white balance based on the control signal; and
    (c) means for adjusting a sensing duration of the sensing means, said adjusting means being operatively connected with the white balance control operation.

12. A white balance control system for an image sensing device which produces a video signal having different color components to be white balance controlled, comprising:
    (a) sensing means for producing a control signal for the white balance control of the image sensing device;
    (b) white balance control means for controlling the white balance based on the control signal; and
    (c) means for sequentially controlling the sensing means and the white balance control means, said means having a first mode which makes the sensing means effective and a second mode which makes the white balance control means effective.

* * * * *